United States Patent [19]
Hanusek et al.

[11] 3,739,480
[45] June 19, 1973

[54] GYRO COMPASSING APPARATUS AND METHOD

[75] Inventors: Frank A. Hanusek, Glen Rock; George Galuschak, Hasbrouck Heights, both of N.J.

[73] Assignee: The Bendix Corporation, Teterboro, N.J.

[22] Filed: Mar. 30, 1970

[21] Appl. No.: 23,547

[52] U.S. Cl. .................................... 33/226 Z, 74/5
[51] Int. Cl. ............................................ G01c 19/38
[58] Field of Search ................... 33/226 Z; 74/5.6, 74/5, 5.2, 5.9, 5.7

[56] References Cited
UNITED STATES PATENTS

| | | | |
|---|---|---|---|
| 3,368,410 | 2/1968 | Dew | 74/5 |
| 3,307,412 | 3/1967 | Granquist | 74/5.6 |
| 2,958,953 | 11/1960 | Thornton et al. | 33/204 |
| 3,330,945 | 7/1967 | Gevas | 33/226 Z |

*Primary Examiner*—Carl D. Quarforth
*Assistant Examiner*—J. M. Potenza
*Attorney*—Anthony F. Cuoco and Plante, Arens, Hartz, Smith and Thompson

[57] ABSTRACT

Gyro compassing apparatus and method for automatically providing a reference position for ground based vehicles. A gyro is displaced about its output axis and said displacement is damped until a steady state condition exists at the reference position.

8 Claims, 4 Drawing Figures

PATENTED JUN 19 1973
3,739,480
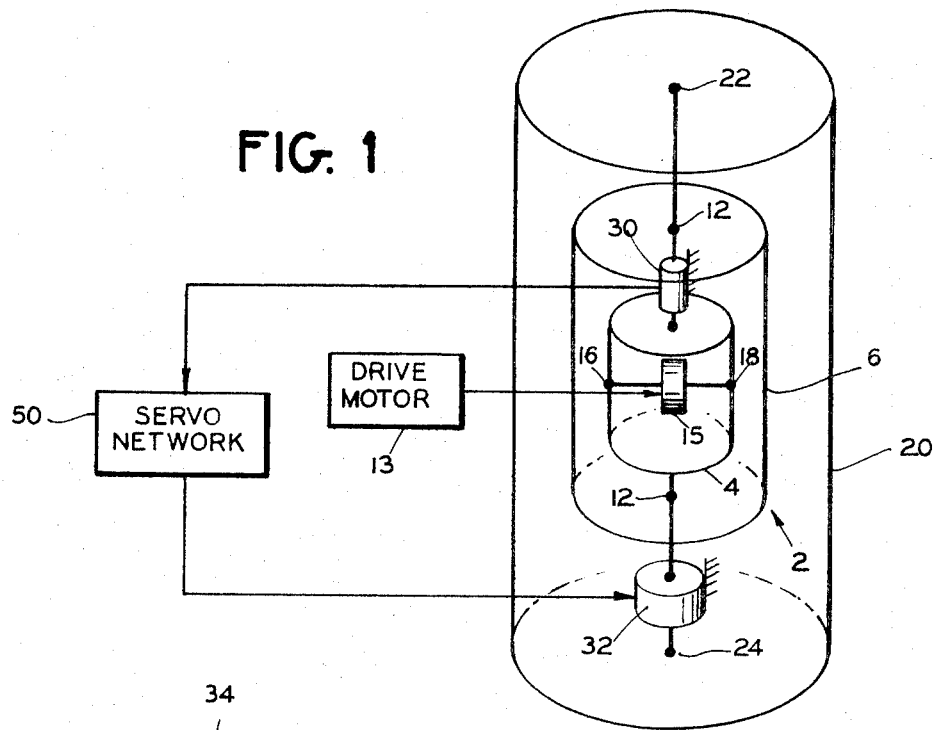
FIG. 1
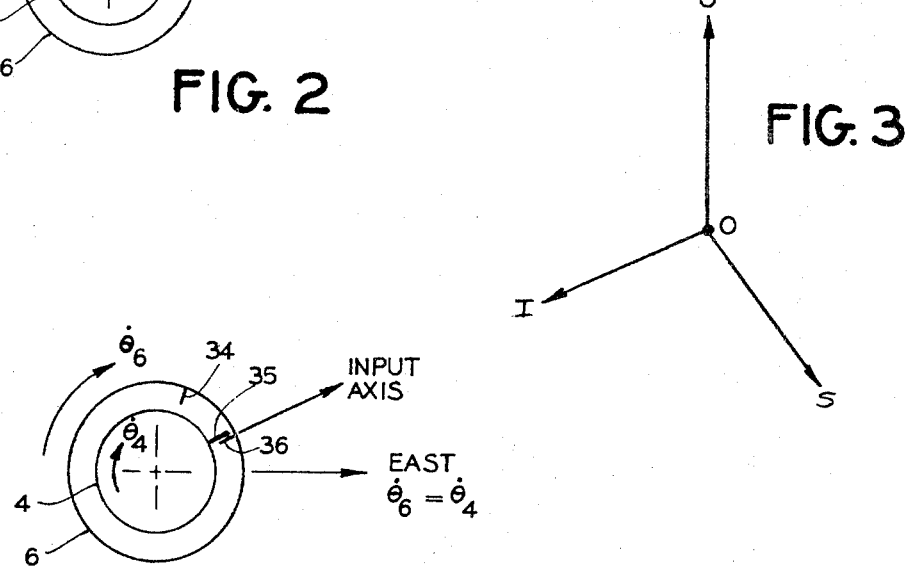
FIG. 2
FIG. 3
FIG. 4
INVENTORS
FRANK A. HANUSEK
GEORGE GALUSCHAK
BY *Anthony F. Cuoco*
ATTORNEY

3,739,480

GYRO COMPASSING APPARATUS AND METHOD

BACKGROUND OF THE INVENTION

1. Field of the Invention

This invention relates to gyros and, particularly, to gyro compasses. More particularly, this invention relates to a single degree of freedom gyro which is mounted with its input axis horizontal and its output axis vertical. The gyro gimbals are arranged so that the gyro automatically seeks the position where its input axis is aligned in an east-west direction for establishing a reference position.

2. Description of the Prior Art

Although gyro compasses are known in the art, there has not heretofore been an instrument using basic gyro principles for automatically obtaining a reference position for a ground based vehicle quickly and with increased accuracy.

SUMMARY OF THE INVENTION

A gyro is operated in open loop configuration and is oriented so that its input axis is horizontal and its output axis is vertical. A gyro pickoff senses a component of earth's rate and provides a corresponding signal for energizing a servo network. The servo network drives a torquer which displaces the gyro about the output axis to drive the input axis east. Gyro displacement is damped until the input axis is east, and whereat no earth's rate is sensed. The gyro will then remain stationary thereby providing a reference position.

One object of this invention is to provide gyro compassing apparatus and method for establishing a reference position for ground based vehicles quickly and with increased accuracy.

Another object of this invention is to use basic gyroscopic principles for establishing the reference position.

Another object of this invention is to support a spinning gyro rotor in an inner gimbal and to support the inner gimbal in an outer gimbal with both of said gimbals being displaced by gyroscopic action about the gyro output axis. The gyro input axis seeks east alignment and displacement of the inner gimbal is damped until said alignment is achieved.

Another object of this invention is to provide stops on the outer gimbal which limit displacement of the inner gimbal causing said gimbal to oscillate between the stops until the gyro input axis is east.

Another object of this invention is to mount the inner gimbal to the outer gimbal with flexural pivots and to utilize the spring rate of said flexural pivots for damping displacement of the inner gimbal.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIG. 1 is a diagrammatic representation showing a gyro gimbaled in accordance with the invention.

FIG. 2 is a diagrammatic representation showing outer gimbal stops for limiting displacement of the inner gimbal in accordance with the invention.

FIG. 3 is a diagrammatic representation showing the relation between the gyro input, output and spin axes.

FIG. 4 is a diagrammatic representation showing the gyro inner gimbal against an outer gimbal stop.

DESCRIPTION OF THE INVENTION

FIG. 1 shows a gyro designated generally by the numeral 2 and having an inner gimbal 4 journaled in an outer gimbal 6 by flexural pivots 12 for displacement about a vertically oriented output axis O—O. A gyro rotor 15 is journaled in inner gimbal 4 by conventional type bearings or pivots 16 and 18 and is driven by a motor 13 to spin about an axis S–O. Gyro 2 has a horizontally oriented input axis I–O. Axes O—O, S—O and I–O are mutually orthogonal as shown in FIG. 3.

Outer gimbal 6 is journaled in a main housing or case 20 by conventional type bearings 22 and 24 for displacement about axis O—O. A pickoff 30 is mounted to outer gimbal 6 and provides an electrical signal corresponding to the position of inner gimbal 4 relative to outer gimbal 6.

A torquer 32 is mounted to case 20 between the case and outer gimbal 6. Torquer 32 is connected to pickoff 30 through a servo network 50 and displaces gimbal 6 about axis O—O in response to the pickoff signal applied through the servo network.

With reference to FIG. 2, outer gimbal 6 has mounted thereto stops 34 and 36. Inner gimbal 4 carries a bumper element 35 which cooperates with stops 34 and 36 so that displacement of inner gimbal 4 is limited to the angular distance between the stops.

Flexural pivots 12 are spring type devices well known in the art and are advantageously used for frictionless journaling as may be required for sensitive instruments such as that now being described. Flexural pivots are described in U.S. Pat. Nos. 3,073,584, 3,132,315 and 3,483,760 to H. Troeger, F.H.S. Rossire and C. Hurlburt, respectively, and which patents are assigned to the Bendix Corporation, assignee of the present invention. In the patents the flexural pivots are used in place of ball bearings for supporting gyro gimbals.

Although flexural pivots have many advantages, among which are simple construction and the capability of withstanding loads in any direction, they have the disadvantage of "spring rate." In many cases it is necessary to cancel or counteract this spring rate and it is to this end that the aforenoted U.S. Pat. No. 3,483,760 to C. Hurlburt is directed. In the present invention, however, the spring rate is used to advantage for damping displacement of gimbal 4 about axis O—O. Flex pivot hysteresis is prevented by limiting displacement of gimbal 4 through stops 34 and 36.

OPERATION

In the operation of the device of the invention, servo network 50 provides the gyro loop with proper constants and compensation. The servo network is arranged so that its natural frequency ($\omega_S$) is less than the natural frequency ($\omega_g$) of the open loop gyro.

With the heretofore described configuration, there are two conditions which must be met; first, when gyro input axis I–O is substantially away from east alignment and second, when input axis I–O is near east alignment. For purposes of the analysis to follow, input axis I–O is considered near east alignment when the alignment is within one-half of the distance between stops 34 and 36, and is considered away from east alignment when the alignment exceeds one-half of said distance.

Considering the first condition, gyro 2 senses a component of earth's rate and applies, via pickoff 30 and servo network 50, a corresponding signal to torquer 32. Torquer 32 rotates gimbal 6 so that input axis I–O moves toward east and, since the gyro is arranged in open loop configuration, inner gimbal 4 generates a torque as follows:

$$T_i = \omega_e H \quad (1)$$

Where $\omega_e$ is earth's rate and H is the angular momentum of spinning gyro wheel 15.

Inner gimbal 4 tries to rotate at a rate ($\dot{\theta}_4$) as follows:

$$\dot{\theta}_4 = (T_i / SJ_0) = (\theta_e H/SJ_0) \quad (2)$$

Where $1/S$ is a transfer function and $J_0$ is the moment of inertia of gimbal 4 about axis O–O.

However, by arranging servo network 50 to rotate gimbal 6 at a rate ($\dot{\theta}_6$) slower than that ($\dot{\theta}_4$) of gimbal 4, gimbal 4 will hit a stop 34, 36 and rotate at rate ($\dot{\theta}_6$) of gimbal 6.

$$\dot{\theta}_4 = \dot{\theta}_6 \quad (3)$$

FIG. 4 shows gimbals 4 and 6 positioned so that the input axis is away from east. Bumper 35 on gimbal 4 is against stop 36 and gimbal 4 rotates at the rate ($\dot{\theta}_6$) of gimbal 6. By predetermining the position of stops 34 and 36 and by selecting an appropriate natural frequency ($\omega_S$) for servo network 50, a condition will occur where bumper 35 will contact a stop 34, 36 exactly at east with the gyro settling thereat to provide a reference position. Gyro 2 is now positioned with its input axis aligned in the east-west direction (spin axis S–O north-south) and the gyro settles so aligned.

Gimbals 4 and 6 rotate at constant rate ($\dot{\theta}_4 = \dot{\theta}_6$) until the input axis I–O is at east, and at which time gimbal 4 rotates at a slower rate than case 6 and will try to oscillate at its natural frequency. This phenomenon occurs because the natural frequency ($\omega_S$) of servo network 50 is selected to be smaller than the natural frequency ($\omega_g$) of gyro 2, and thus servo network 50 will not respond as fast as gimbal 4. As the gimbal oscillates toward east, bumper 35 contacts a stop 34, 36 exactly at east where gimbal 6 is at its peak amplitude of oscillation and its rate is zero.

Considering the second condition; i.e. when input axis I–O is near east, gimbals 4 and 6 will tend to oscillate at their natural frequencies and at amplitudes of oscillation depending upon the initial position of gyro 2. As gimbal 4 and gimbal 6 oscillate, bumper 35 on gimbal 4 will contact a stop 34, 36, and in so doing new conditions will be created; i.e. new amplitudes and frequencies of oscillation. Gimbal 4 and gimbal 6 again oscillate until a stop is contacted, again creating new conditions. This continues, with input axis I–O coming closer to east with each contact of bumper 35 and a stop 34, 36 until axis I–O settles at east (axis S–O north). At this time, gimbal 4 oscillates at a low frequency and minimum amplitude of oscillation.

The apparatus and method of the invention herein described considers that spinning rotor 15 causes inner gimbal 4 to be displaced about output axis O–O. Torquer 24 drives, through pickoff 30 and servo network 50, outer gimbal 6 about axis O–O causing gimbal 4 to oscillate between stops 34 and 36. The oscillations are damped by spring action of flexural pivots 12 until input axis I–O is east (spin axis S–O north) to establish the reference position. The reference position is established quickly and with increased accuracy, and is achieved using basic gyroscopic principles. Flexural pivot hysteresis is minimized by stops 34 and 36 so that the reference position is accurately established.

While one embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A gyro compass, comprising:
   a case;
   an outer gimbal mounted to the case for displacement about a vertical axis;
   an inner gimbal;
   flexural pivots mounting the inner gimbal to the outer gimbal for displacement about a vertical axis, said flexural pivots having a spring constant for damping displacement of the inner gimbal;
   a rotor mounted to the inner gimbal for spinning about a horizontal axis;
   means for spinning the rotor about the horizontal axis whereupon the inner gimbal is displaced about the vertical axis;
   means for sensing displacement of the inner gimbal relative to the outer gimbal and for providing a corresponding signal;
   means responsive to the signal from the sensing means for displacing the outer gimbal;
   a pair of stops mounted to the outer gimbal; and
   a bumper mounted to the inner gimbal and disposed between the stops, and contacting said stops for limiting displacement of the inner gimbal and for causing the horizontal axis to settle at a reference position.

2. A gyro compass as described by claim 1, wherein the means responsive to the signal from the sensing means for displacing the outer gimbal includes:
   a servo network connected to the sensing means and responsive to the signal therefrom for providing an electrical output; and
   a torquer connected to the servo network and to the outer gimbal and responsive to the electrical output therefrom for displacing the outer gimbal.

3. A gyro compass as described by claim 2, wherein:
   the servo network and the torquer are arranged for displacing the outer gimbal at a rate slower than the displacement rate of the inner gimbal, whereupon the bumper on the inner gimbal contacts one of the stops on the outer gimbal and the inner gimbal is thereafter displaced at the displacement rate of the outer gimbal.

4. A gyro compass as described by claim 3, wherein:

the natural frequency of the servo network and the position of the stops on the outer gimbal are predetermined so that when the bumper contacts the one stop the horizontal axis is at the reference position.

5. A gyro compass as described by claim 1, wherein: the inner gimbal oscillates between the stops at its natural frequency, with the bumper contacting the stops for effecting other progressively lower frequencies of oscillation until the horizontal axis settles at the reference position.

6. A gyro compassing method, comprising:
spinning a gyro rotor mounted in an inner gimbal about a horizontal axis for displacing the inner gimbal about a vertical axis;
sensing the displacement of the inner gimbal relative to an outer gimbal which supports the inner gimbal and providing a corresponding signal;
displacing the outer gimbal about the vertical axis in response to said signal;
damping displacement of the inner gimbal about the vertical axis; and
limiting displacement of the inner gimbal for causing settling of the horizontal axis at a reference position.

7. A gyro compassing method as described by claim 6, including:
displacing the outer gimbal at a rate slower than that of the inner gimbal;
limiting displacement of the inner gimbal; and
displacing the inner gimbal at the displacement rate of the outer gimbal until the horizontal axis is at the reference position.

8. A gyro compassing method as described by claim 6, including:
oscillating the inner gimbal at its natural frequency; and
limiting the oscillations for effecting other progressively lower frequencies of oscillation until the horizontal axis settles at the reference position.

* * * * *